June 30, 1931. C. B. BAILEY 1,812,578
GASKET
Filed May 20, 1926
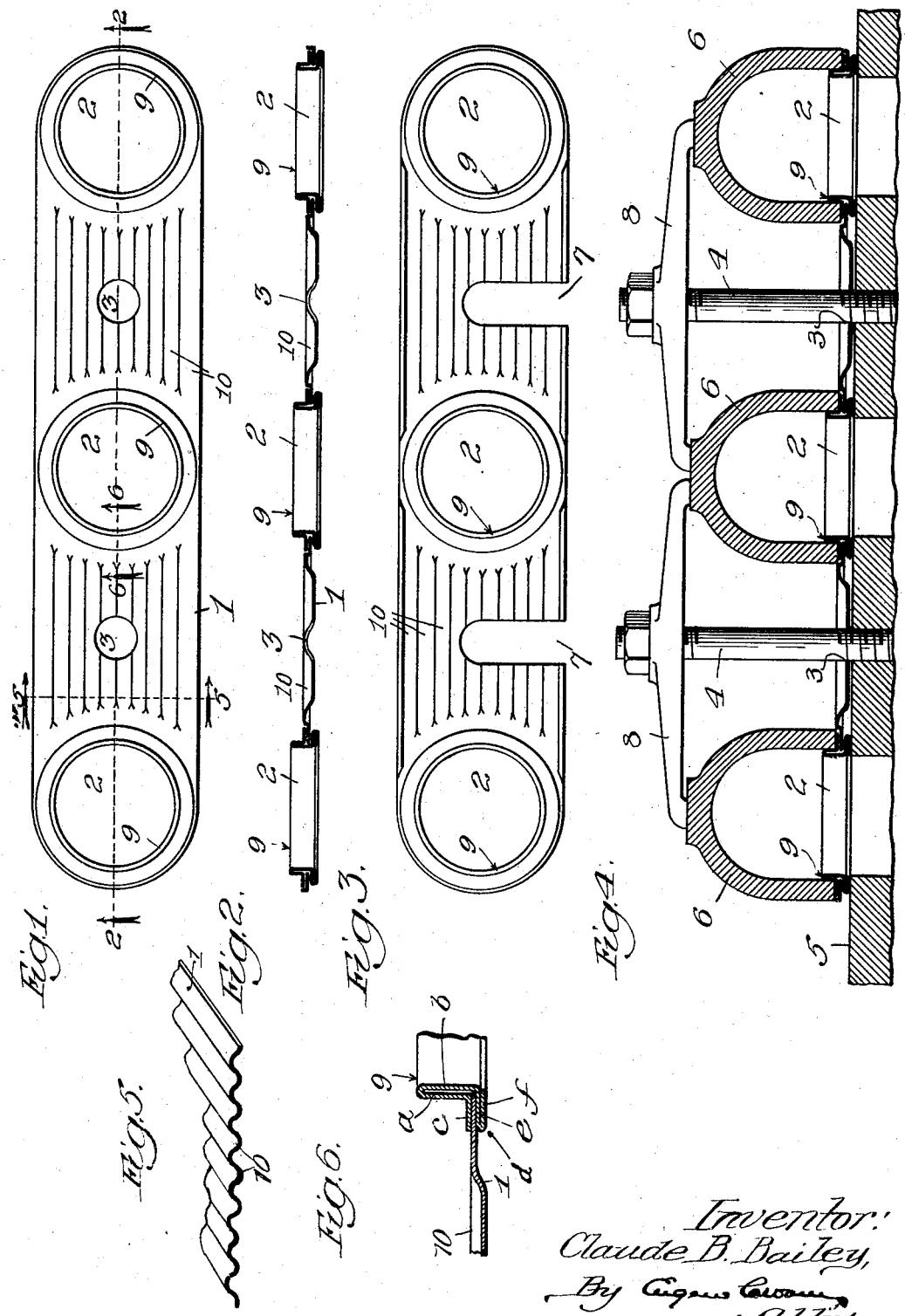

Patented June 30, 1931

1,812,578

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed May 20, 1926. Serial No. 110,322.

This invention has particular reference to manifold gaskets, such as are in elongated or strip form and have a plurality of stud and port holes spaced apart lengthwise of the gasket body so that single gaskets may accommodate a plurality of port openings in a cylinder block and its associated manifold pipes, as in automobile engines.

In my copending application Serial No. 31,484, filed May 20, 1925, now Patent No. 1,738,513 issued Dec. 10, 1929, I have disclosed and claimed a manifold gasket having its body portion of a single layer of sheet metal, with tubular guides of sheet metal carried on the body portion about the respective port holes for guiding the manifold pipes in registration with the associated port holes in the cylinder block. Said application also shows the pressure receiving and joint sealing portions of the gasket made entirely of sheet metal and combined with the guides.

The object of my present invention is to provide the body layer of the gasket with a plurality of corrugations, preferably extending lengthwise of the gasket between the port holes so as to stiffen the gasket body against bending and distortion, and thus permit the making of the body of the gasket of a single layer of sheet metal of a relatively light gage or thickness.

The invention consists further in the matters hereinafter described and claimed.

In the accompanying drawings—

Fig. 1 is a top plan view of a manifold gasket constructed in accordance with my invention;

Fig. 2 is a vertical sectional view taken on line 2—2 of Fig. 1;

Fig. 3 is a top plan view of a gasket made the same as in Fig. 1, except that the stud openings are slotted in the body layer of the gasket;

Fig. 4 is a vertical sectional view showing the gasket clamped in place between a cylinder block and its associated manifold pipes;

Fig. 5 is a cross-section in perspective, taken on line 5—5 of Fig. 1; and

Fig. 6 is an enlarged vertical sectional view through one of the guides of the gasket of Fig. 1, taken on line 6—6 of Fig. 1.

The manifold gasket shown in the drawings has a relatively narrow and elongated body portion 1 of a single layer of sheet metal, such as copper, brass, aluminum, zinc, or the like. The body layer 1 is provided with a plurality of port holes 2, 2 of the same size and spaced apart lengthwise of the layer, as shown in the drawings. In the gasket shown in Figs. 1 and 2, the body layer 1 is provided with a plurality of holes 3, 3, smaller than the port holes 2 and arranged between them to receive the studs or bolts 4 for holding the gasket in position between the cylinder block 5 and the associated manifold pipes 6, 6, as shown in Fig. 4. In the gasket shown in Fig. 3, the openings through the body layer 1 for the studs 4 are in the form of slots 7, 7 extending through one side edge of the layer. These slots facilitate applying the gasket on the studs 4, as the gasket may be slipped edgewise over the studs without the necessity of removing the manifold clamps 8 from the studs, as is required when the openings for the studs are in the form of holes 3 as shown in the gasket in Figs. 1 and 2.

The gasket is provided with a plurality of tubular guides 9 about the respective port holes 2 and projecting outward from the plane of the body layer 1 from one side of the same. The guides are made of sheet metal independent of the body layer 1, and are inserted in the port holes 2, 2.

Each guide, as shown in Fig. 6, is folded on itself to provide inner and outer annular portions $a$, $b$ integrally connected by the fold in the metal between them, said fold forming the outer edge of the guide. The outer member $a$ is provided with a base flange $c$ extending completely about the guide and bearing on the layer 1 on the same side as the guide.

The inner member $b$ extends through the port hole 2 in the layer 1, and has its marginal portion flanged outward, as at $d$, and engaging the surface of the layer 1 on the side opposite to the flange $c$. The flanges $c$, $d$ engage the body layer 1 on opposite sides and clamp the guide thereto.

The flange $d$ is folded or doubled on itself to provide two overlapping layers $e$, $f$ integrally connected by the fold between them, as shown in Fig. 6.

The sheet metal portions provided by the flanges $c$, $d$ of the guides and the portion of the body layer 1 between them make the pressure receiving and joint sealing sections of the gasket entirely of sheet metal, thereby avoiding the use and expense of asbestos rings or layers at these portions.

To stiffen the body layer 1 against bending and distortion, I provide the same with a plurality of corrugations 10, 10. These extend lengthwise of the layer 1 and in stiffening the same allow the body of the gasket to be made of a single layer of sheet metal of a relatively thin gage. As shown in the drawings, the corrugations are disposed between the guides 9, 9 and are arranged parallel to each other and to the side edges of the gasket. They terminate short of the portions of the layer immediately surrounding the port holes, where the pressure and joint sealing sections of the gasket are made, as shown in Figs. 1 and 3.

By corrugating the body layer, the gasket may be made cheaper and will stand up to better advantage, due to the elimination of excess material heretofore required to make gaskets stiff enough for manifold purposes. Moreover, by reason of the corrugations, the gasket layer may be provided with the slotted stud holes 7, 7, as the corrugations stiffen the layer sufficiently to permit the use of these slotted stud holes without so weakening the material as to fracture or break at the inner ends of the slots.

The details of structure may be variously changed and modified without departing from the spirit and scope of my invention.

I claim as my invention:

1. A manifold gasket having an elongated body portion of a single layer of sheet metal with stud openings and port holes therein spaced apart lengthwise of the body layer, means carried by the body layer immediately about the respective port holes and formed entirely of sheet metal to provide the pressure receiving and joint sealing sections of the gasket, and corrugations in the body layer between and entirely outside of said sections to stiffen the layer against bending and distortion.

2. A manifold gasket having a body portion of a single layer of sheet metal with port holes therein spaced apart lengthwise of the body layer, combined tubular guides and pressure receiving and joint sealing sections entirely of sheet metal carried by the body layer immediately about the respective port holes, corrugations provided in the body layer between and entirely outside of said sections and guides to stiffen the layer against bending, and slotted stud openings in the corrugated portions of the body layer and extending through one edge thereof.

In testimony whereof I affix my signature this 8 day of May, 1926.

CLAUDE B. BAILEY.